United States Patent [19]

Giles

[11] 4,373,857
[45] Feb. 15, 1983

[54] METHOD FOR TRANSPORTING BULK FLUID OR PARTICULATE MATERIAL

[75] Inventor: William L. Giles, Des Moines, Iowa

[73] Assignee: Ruan, Incorporated, Des Moines, Iowa

[21] Appl. No.: 168,109

[22] Filed: Jul. 14, 1980

[51] Int. Cl.³ .................................................. B60P 3/07
[52] U.S. Cl. .................................... 414/786; 414/481; 410/6; 410/67
[58] Field of Search .................... 414/481, 498, 500, 7, 414/86; 105/159; 104/48, 137; 410/3, 4, 67

[56] References Cited

U.S. PATENT DOCUMENTS

| | | | |
|---|---|---|---|
| 1,611,882 | 12/1926 | Budd | 105/159 X |
| 2,058,955 | 10/1936 | Culemeyer | 105/159 X |
| 4,103,793 | 8/1978 | Weaver | 414/481 |
| 4,109,806 | 8/1978 | Johannson | 414/498 X |

FOREIGN PATENT DOCUMENTS 350585  6/1931  United Kingdom ................ 414/481

*Primary Examiner*—Allen N. Knowles
*Attorney, Agent, or Firm*—Zarley, McKee, Thomte, Voorhees & Sease

[57] ABSTRACT

A method and apparatus for transporting fluid or particulate material is described wherein a railroad car is placed on a truck-trailer unit and is transported over land by the truck-trailer to the source of the material. The railroad car is loaded with the material at the source of the material while the railroad car is on the truck-trailer unit and is then transported over land to a rail terminal by the truck-trailer unit. The loaded railroad car is then unloaded from the truck-trailer unit at the rail terminal for subsequent rail transportation. A second method of transporting the material is described wherein the railroad car is loaded with the material and is transported by rail to a rail terminal. The loaded railroad car is loaded onto the truck-trailer unit at the rail terminal and is transported over land to a material unloading location by the truck-trailer unit. The material is unloaded from the loaded railroad car at the material unloading station while the railroad car is on the truck-trailer unit. The truck-trailer unit comprises a wheeled frame having a folding gooseneck at the forward end which serves as an unloading and loading ramp. The ramp includes either a pair of spaced-apart rails or guides for facilitating the unloading and loading of the railroad car.

6 Claims, 8 Drawing Figures

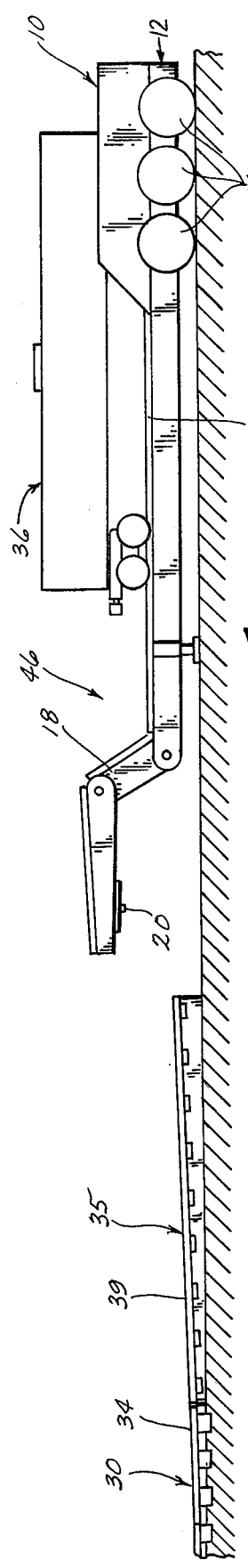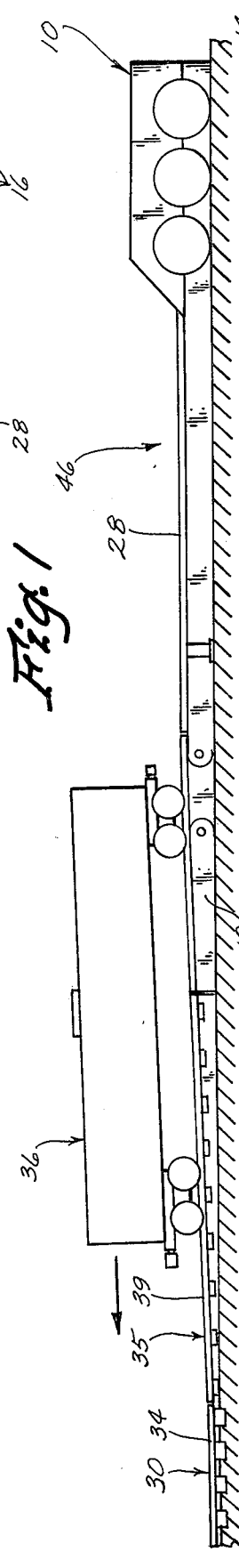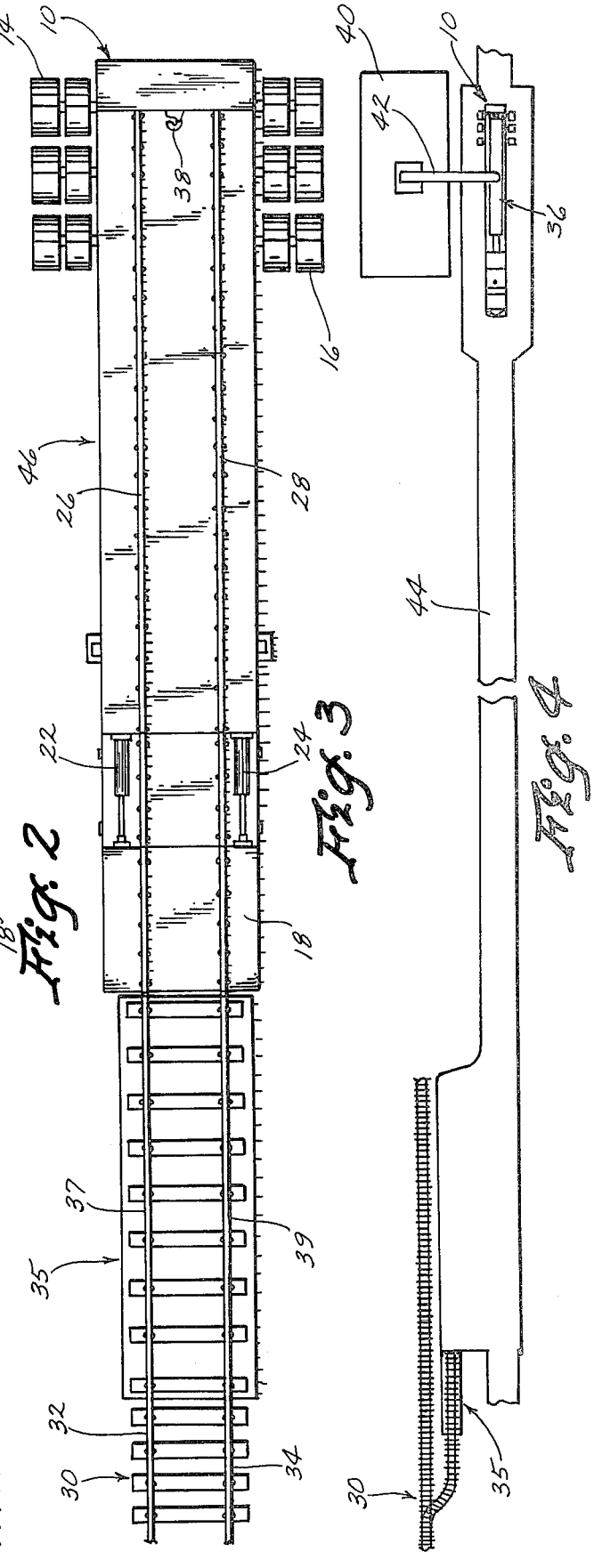

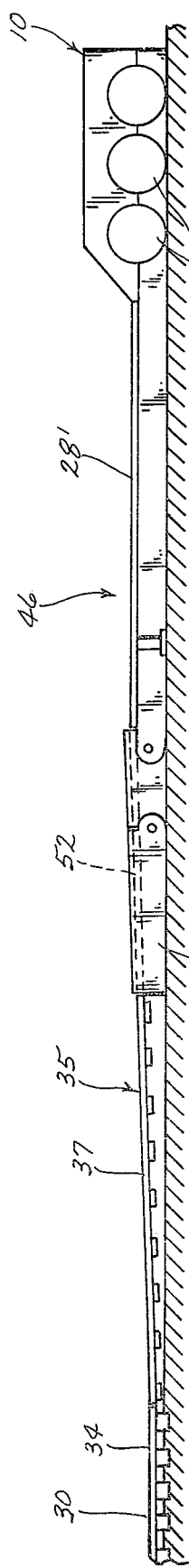
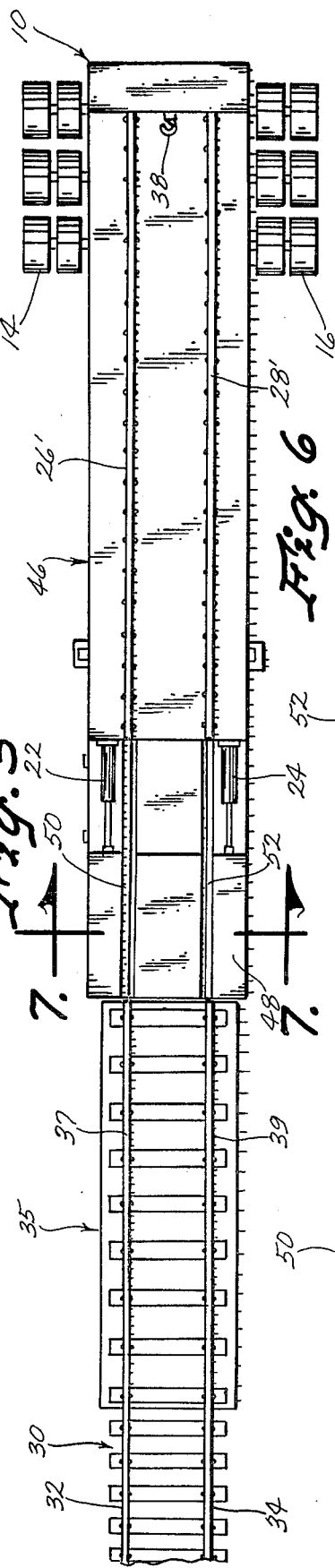
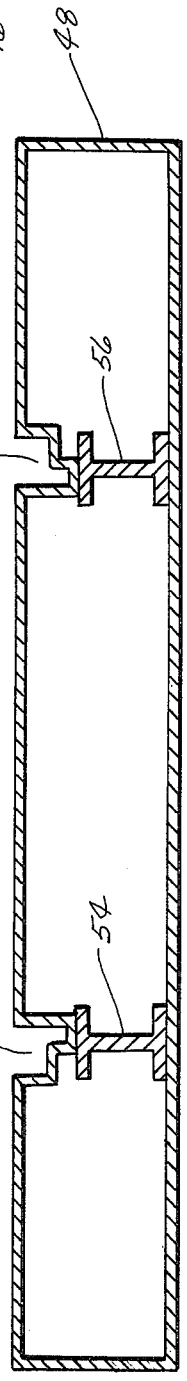
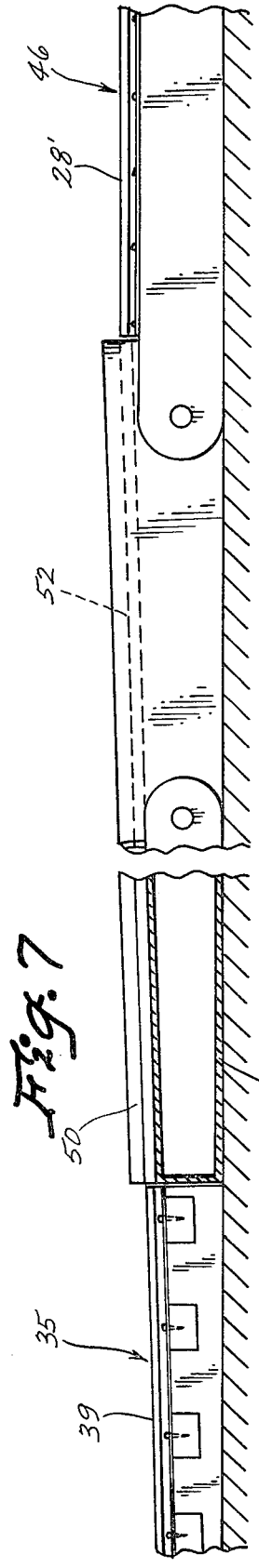

METHOD FOR TRANSPORTING BULK FLUID OR PARTICULATE MATERIAL

BACKGROUND OF THE INVENTION

This invention relates to a method and means for transporting fluid or particulate material and more particularly to a method and means for transporting material by means of a railroad car placed on a truck-trailer unit.

Sources of fluid or particulate material such as mines or wells are frequently located in remote areas which are not served by railroads. One method of transporting the material to the desired location has been to drive the tank trucks or the like to the source wherein the material is loaded on the truck. The trucks are then driven to a rail terminal where the material is unloaded from the tank truck into a railroad car with the railroad car then being transported to the desired location. The above-described method is not efficient and is very costly. Additionally, the additional loading and unloading steps required by the above-described method create some hazards when the material being transported is a hazardous material, substance, or waste.

Therefore, it is a principal object of the invention to provide an improved method and means for transporting fluid or particulate material.

A further object of the invention is to provide a method of transporting fluid or particulate material wherein an empty railroad car is loaded onto a truck-trailer unit and transported to the source of material.

A still further object of the invention is to provide a method of transporting fluid or particulate material wherein a loaded railroad car is transported by rail to a rail terminal where the loaded railroad car is loaded onto a truck-trailer unit and transported over land to an unloading station or terminal.

A still further object of the invention is to provide a method of transporting fluid or particulate material wherein the material is loaded onto a railroad car positioned on a truck-trailer unit.

A still further object of the invention is to provide a method and means for transporting fluid or particulate material which is economical.

A still further object of the invention is to provide a method and means for transporting fluid or particulate material which reduces handling and transfer of hazardous materials, substances or waste thereby increasing safety to handling personnel and the public.

A still further object of the invention is to provide a truck-trailer unit which may be used to transport railroad cars thereon and which includes a folding gooseneck at the forward end thereof which serves as an unloading and loading ramp.

A still further object of the invention is to provide a truck-trailer unit for transporting a railroad car thereon including means for guiding the railroad car onto a folding ramp provided at the forward end thereof.

These and other objects will be apparent to one skilled in the art.

BRIEF DESCRIPTION OF THE DRAWINGS

FIG. 1 is a side-schematic view illustrating a railroad car positioned on the truck-trailer unit;

FIG. 2 is a view similar to FIG. 1 except that the railroad car is being unloaded on the truck-trailer unit;

FIG. 3 is a top view of the truck-trailer unit and unloading terminal of FIG. 2;

FIG. 4 is a schematic showing a plan view of a railroad terminal and a remotely located loading operation such as a mine or the like;

FIG. 5 is a view similar to FIG. 2 but which illustrates a modified form of the truck-trailer unit;

FIG. 6 is a top view of the embodiment of FIG. 5;

FIG. 7 is an enlarged sectional view taken along line 7—7 of FIG. 6; and

FIG. 8 is a partial side view of the embodiment of FIG. 5 with portions thereof cut away to more fully illustrate the invention.

SUMMARY OF THE INVENTION

Two methods of transporting material are described. In the first method, a railroad car is placed on a truck-trailer unit and transported over land to the source of material where the railroad car is loaded while the railroad car is on the truck-trailer. The loaded railroad car is then transported over land to a rail terminal by the truck-trailer unit. The loaded railroad car is unloaded from the truck-trailer unit at the rail terminal for subsequent rail transportation. In the second method, a railroad car is loaded with the material and is transported by rail to a rail terminal. The loaded railroad car is then placed on a truck-trailer unit and transported over land to a material unloading location. The material is unloaded from the loaded railroad car at the material unloading station while the railroad car is on the truck-trailer unit. The truck-trailer unit comprises a folding gooseneck at the forward end thereof which not only serves to connect the truck-trailer unit to prime mover but which also serves as a loading and unloading ramp for the railroad car which is positioned on the truck-trailer unit. Means is provided on the gooseneck for guiding the railroad car thereover.

DESCRIPTION OF THE PREFERRED METHODS AND EMBODIMENT

In FIG. 1, the numeral 10 refers to a truck-trailer unit comprising a frame means 12 supported by a plurality of wheels 14 and 16 positioned at the opposite rearward sides thereof. A folding gooseneck 18 is provided at the forward end of the truck-trailer unit and includes a kingpin 20 which is adapted to be secured to a conventional fifth-wheel connector assembly on the prime mover or truck. The folding gooseneck assembly 18 is pivotally moved from the position of FIG. 1 to the position of FIG. 3 by means of a pair of hydraulic cylinders 22 and 24. The truck-trailer unit is provided with a pair of spaced-apart tracks or rails 26 and 28 positioned on the upper surface thereof which extend from the rearward end thereof over the gooseneck assembly 18 as illustrated in FIG. 3. The numeral 30 refers generally to a loading or unloading station or terminal including a pair of spaced-apart tracks or rails 32 and 34. A portable ramp 35 is positioned at the end of the tracks 32 and 34 and includes tracks 37 and 39 aligned with tracks 32 and 34 respectively. The truck-trailer unit 10 is designed to accomodate a railroad car 36 thereon as illustrated in FIGS. 1 and 2. Truck-trailer unit 10 includes a coupling or locking apparatus 38 at its rearward end which is adapted to be secured to the coupling assembly at one end of the railroad car 36.

FIG. 4 is a schematic plan view of the railroad terminal 30 and a remotely located operation such as a mine or the like. FIG. 4 illustrates the situation wherein the railroad car 36 has been transported over land to the mine 40 wherein the material at the mine 40 is loaded onto the railroad car 36 by means of loading apparatus 42. The loaded car 36 is then transported over land such as the highway 44 to the terminal 30 where the railroad car 36 is then unloaded from the truck-trailer unit and placed on the rail system for transportation to the desired location.

It should also be understood that a loaded railroad car 36 could be placed on the truck-trailer unit 10 at terminal 30 and then transported over land to a remote location where the material in the tank car is unloaded while the railroad car is on the truck-trailer unit 10. It should further be noted that the railroad car 36 could be placed on the truck-trailer unit 10 at terminal 30 and then loaded with the material for subsequent transportation over land to a location where the material is unloaded from the railroad car 36 while the railroad car is on the truck-trailer unit 10.

Referring to the embodiment of the truck-trailer unit illustrated in FIGS. 5-8, the numeral 46 is generally used to designate the truck-trailer unit. The truck-trailer unit 46 is identical to the truck-trailer unit 10 except that rails or tracks are not employed on the folding gooseneck which is designated by the numeral 48 in FIGS. 5-8. The gooseneck ramp 48 is provided with a pair of spaced-apart channels 50 and 52 which extend downwardly into the upper surface of the gooseneck 48 and which serve as guides for the wheels of the railroad car being moved thereover. Preferably, supporting beams 54 and 56 are provided below the channels 50 and 52 to aid in supporting the railroad car as it passes thereover. In both embodiments of the truck-trailer unit, the folding goosenecks are moved to the position illustrated in FIGS. 2 and 5 to facilitate the loading and unloading of the railroad car. In the embodiment of FIG. 1, the railroad car 36 moves onto the rails 26 and 28 as the railroad car moves over the gooseneck. In the embodiment of FIGS. 5-8, the wheels of the railroad car are guided by the channels 50 and 52 which are aligned with the rails 26' and 28' on the truck-trailer unit 46. In both of the embodiments, the folding gooseneck not only serves as a means of connecting the truck-trailer unit to a prime mover but serves as the loading and unloading ramp.

Thus it can be seen that a novel method of transporting material has been described which eliminated costly transfers of the material from one unit to another and permits railroad cars to be transported over land to remote locations for loading or unloading. Thus it can be seen that the invention accomplishes at least all of its stated objectives.

I claim:

1. The method of transporting fluid or particulate material, comprising,
    providing a truck-trailer unit including a wheeled frame means having a folding gooseneck apparatus at the forward end thereof and elongated track means extended over the substantial length of said frame means and gooseneck apparatus,
    aligning said truck-trailer unit with a railroad track having a railroad car thereon,
    folding said gooseneck apparatus to a substantially horizontally disposed position,
    loading said railroad car onto the truck-trailer unit by rolling said railroad car from said railroad track onto said elongated track means of said substantially horizontally disposed gooseneck apparatus and onto said frame means rearwardly of said gooseneck apparatus,
    folding said gooseneck apparatus to a normal position in a goose neck configuration,
    connecting a prime mover to said normally positioned gooseneck apparatus,
    transporting said railroad car over land by said truck-trailer unit to the source of said material,
    loading said railroad car with said material while said railroad car is on said truck-trailer unit,
    transporting said loaded railroad car over land to a rail terminal by said truck-trailer unit,
    and unloading said loaded railroad car from said truck-trailer unit at said rail terminal for subsequent rail transportation.

2. The method of claim 1 further comprising providing a portable ramp having elongated track means thereon and interposing said portable ramp between a railroad track and said truck-trailer unit with its gooseneck apparatus in a substantially horizontally disposed position thereby facilitating the loading and unloading of a railroad car onto and from said truck-trailer unit.

3. The method of claim 1 wherein said truck-trailer unit includes a coupling apparatus at its rearward end and further comprising securing said coupling apparatus to the coupling assembly at one end of a railroad car supported on said truck-trailer unit.

4. The method of transporting fluid or particulate material, comprising,
    loading a railroad car with said material,
    transporting said loaded railroad car by railroad track to a rail terminal,
    providing a truck-trailer unit including a wheeled frame means having a folding gooseneck apparatus at the forward end thereof and elongated track means extended over the substantial length of said frame means and gooseneck apparatus,
    aligning said truck-trailer unit with the railroad track on which said railroad car is supported,
    folding said gooseneck apparatus to a substantially horizontally disposed position,
    placing said loaded railroad car onto the truck-trailer unit by rolling said railroad car from said railroad track over said elongated track means of said substantially disposed gooseneck apparatus and onto said frame means rearwardly of said goose neck apparatus,
    folding said gooseneck apparatus to a normal position in a gooseneck configuration,
    connecting a prime mover to said normally positioned gooseneck apparatus,
    transporting said loaded railroad car over land to a material unloading location by said truck-trailer unit,
    and unloading said material from said loaded railroad car at said material unloading location while said railroad car is on said truck-trailer unit.

5. The method of transporting fluid or particulate material, comprising,
    providing a truck-trailer unit including a wheeled frame means having a folding gooseneck apparatus at the forward end thereof and elongated track means extended over the substantial length of said frame means and gooseneck apparatus,
    aligning said truck-trailer unit with a railroad track having a railroad car thereon,
    folding said gooseneck apparatus to a substantially horizontally disposed position, loading said railroad car onto the truck-trailer unit by rolling said railroad car from said railroad track onto said elongated track means of said substantially horizontally disposed gooseneck apparatus and onto said frame means rearwardly of said gooseneck apparatus, folding said gooseneck apparatus to a normal position in a goose neck configuration, connecting a prime mover to said normally positioned gooseneck apparatus, transporting said truck-trailer unit and said railroad car to the source of said material, loading said railroad car with said material while said railroad car is on said truck-trailer unit, transporting said loaded railroad car to an unloading terminal by said truck-trailer unit, and unloading the said material from said railroad car at said unloading terminal.

6. The method of claim 5 wherein said material is unloaded from said railroad car at said unloading terminal while said railroad car is on said truck-trailer unit.

* * * * *